US010535106B2

(12) United States Patent
Mashiach et al.

(10) Patent No.: US 10,535,106 B2
(45) Date of Patent: Jan. 14, 2020

(54) SELECTING USER POSTS RELATED TO TRENDING TOPICS ON ONLINE SOCIAL NETWORKS

(71) Applicant: Facebook, Inc., Menlo Park, CA (US)

(72) Inventors: Li-Tal Mashiach, Redmond, WA (US); Ashish Sharma, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 165 days.

(21) Appl. No.: 15/392,362

(22) Filed: Dec. 28, 2016

(65) Prior Publication Data

US 2018/0181662 A1    Jun. 28, 2018

(51) Int. Cl.
*G06F 16/00* (2019.01)
*G06Q 50/00* (2012.01)

(52) U.S. Cl.
CPC .................................. *G06Q 50/01* (2013.01)

(58) Field of Classification Search
CPC ......... G06F 17/30905; G06F 17/30867; G06F 17/30; G06F 17/30106; G06F 17/30522; G06F 17/30283; G06F 17/30952; G06F 17/30315; G06F 17/30613; G06F 17/30622; G06F 17/30628; G06F 17/2217; G11C 16/08; G06Q 50/20; G06Q 40/08; G06Q 50/01; G06Q 10/101; G06Q 10/04; H03K 19/17728; H03M 7/46

See application file for complete search history.

(56) References Cited

U.S. PATENT DOCUMENTS

| | | | |
|---|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |

(Continued)

*Primary Examiner* — Anh Ly
(74) *Attorney, Agent, or Firm* — Baker Botts L.L.P.

(57) ABSTRACT

In one embodiment, a method includes receiving a query associated with a trending topic selected by a user of an online social network from multiple trending topics and rewriting the query into a query command including multiple query constraints. The method also includes identifying one or more posts matching the query command, where each identified post has privacy settings making the post visible to all users of the online social network, and calculating, for each of the identified posts, a score for the post based on one or more post-quality features, where the score is calculated using a machine-learning model that assigns a particular weight to each of the one or more post-quality features. The method also includes sending to the user a commentary module including at least a portion of each of one or more of the identified posts having scores higher than a threshold score.

19 Claims, 7 Drawing Sheets

(56) References Cited

U.S. PATENT DOCUMENTS

| | | | |
|---|---|---|---|
| 8,112,529 B2 | 2/2012 | Van Den Oord | |
| 8,135,721 B2 | 3/2012 | Joshi | |
| 8,145,636 B1 | 3/2012 | Jeh | |
| 8,180,804 B1 | 5/2012 | Narayanan | |
| 8,185,558 B1 | 5/2012 | Narayanan | |
| 8,209,330 B1 | 6/2012 | Covell | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1 | 10/2012 | Myllymaki | |
| 8,306,922 B1 | 11/2012 | Kunal | |
| 8,312,056 B1 | 11/2012 | Peng | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |
| 8,538,960 B2 | 9/2013 | Wong | |
| 8,572,129 B1 | 10/2013 | Lee | |
| 8,578,274 B2 | 11/2013 | Druzgalski | |
| 8,595,297 B2 | 11/2013 | Marcucci | |
| 8,601,027 B2 | 12/2013 | Behforooz | |
| 8,606,721 B1 | 12/2013 | Dicker | |
| 8,606,792 B1 * | 12/2013 | Jackson | H04L 51/32 707/748 |
| 8,639,725 B1 | 1/2014 | Udeshi | |
| 8,732,208 B2 | 5/2014 | Lee | |
| 8,751,521 B2 | 6/2014 | Lee | |
| 8,775,324 B2 | 7/2014 | Zhu | |
| 8,782,080 B2 | 7/2014 | Lee | |
| 8,782,753 B2 | 7/2014 | Lunt | |
| 8,832,111 B2 | 9/2014 | Venkataramani | |
| 8,868,590 B1 | 10/2014 | Donneau-Golencer | |
| 8,868,603 B2 | 10/2014 | Lee | |
| 8,898,226 B2 | 11/2014 | Tiu | |
| 8,909,637 B2 | 12/2014 | Patterson | |
| 8,914,392 B2 | 12/2014 | Lunt | |
| 8,918,418 B2 | 12/2014 | Lee | |
| 8,924,406 B2 | 12/2014 | Lunt | |
| 8,935,255 B2 | 1/2015 | Sankar | |
| 8,935,261 B2 | 1/2015 | Pipegrass | |
| 8,935,271 B2 | 1/2015 | Lassen | |
| 8,949,232 B2 | 2/2015 | Harrington | |
| 8,949,250 B1 | 2/2015 | Garg | |
| 8,949,261 B2 | 2/2015 | Lunt | |
| 8,954,675 B2 | 2/2015 | Venkataramani | |
| 8,983,991 B2 | 3/2015 | Sankar | |
| 9,032,289 B1 * | 5/2015 | Cierniak | G06F 16/9558 715/255 |
| 9,208,444 B1 * | 12/2015 | Zheng | G06Q 30/0201 |
| 9,330,174 B1 * | 5/2016 | Zhang | G06F 16/95 |
| 2002/0059199 A1 | 5/2002 | Harvey | |
| 2002/0086676 A1 | 7/2002 | Hendrey | |
| 2002/0196273 A1 | 12/2002 | Krause | |
| 2003/0154194 A1 | 8/2003 | Jonas | |
| 2003/0208474 A1 | 11/2003 | Soulanille | |
| 2004/0088325 A1 | 5/2004 | Elder | |
| 2004/0172237 A1 | 9/2004 | Saldanha | |
| 2004/0215793 A1 | 10/2004 | Ryan | |
| 2004/0243568 A1 | 12/2004 | Wang | |
| 2004/0255237 A1 | 12/2004 | Tong | |
| 2005/0091202 A1 | 4/2005 | Thomas | |
| 2005/0125408 A1 | 6/2005 | Somaroo | |
| 2005/0131872 A1 | 6/2005 | Calbucci | |
| 2005/0171955 A1 | 8/2005 | Hull | |
| 2005/0256756 A1 | 11/2005 | Lam | |
| 2006/0041597 A1 | 2/2006 | Conrad | |
| 2006/0117378 A1 | 6/2006 | Tam | |
| 2006/0136419 A1 | 6/2006 | Brydon | |
| 2006/0190436 A1 | 8/2006 | Richardson | |
| 2006/0218111 A1 | 9/2006 | Cohen | |
| 2007/0174304 A1 | 7/2007 | Shrufi | |
| 2007/0192293 A1 | 8/2007 | Swen | |
| 2007/0277100 A1 | 11/2007 | Sheha | |
| 2008/0005064 A1 | 1/2008 | Sarukkai | |
| 2008/0033926 A1 | 2/2008 | Matthews | |
| 2008/0072180 A1 | 3/2008 | Chevalier | |
| 2008/0114730 A1 | 5/2008 | Larimore | |
| 2008/0183694 A1 | 7/2008 | Cane | |
| 2008/0183695 A1 | 7/2008 | Jadhav | |
| 2008/0270615 A1 | 10/2008 | Centola | |
| 2009/0006543 A1 | 1/2009 | Smit | |
| 2009/0054043 A1 | 2/2009 | Hamilton | |
| 2009/0094200 A1 | 4/2009 | Baeza-Yates | |
| 2009/0164408 A1 | 6/2009 | Grigorik | |
| 2009/0164431 A1 | 6/2009 | Zivkovic | |
| 2009/0164929 A1 | 6/2009 | Chen | |
| 2009/0197681 A1 | 8/2009 | Krishnamoorthy | |
| 2009/0222348 A1 | 9/2009 | Ransom | |
| 2009/0228296 A1 | 9/2009 | Ismalon | |
| 2009/0259624 A1 | 10/2009 | DeMaris | |
| 2009/0259646 A1 | 10/2009 | Fujita | |
| 2009/0265326 A1 | 10/2009 | Lehrman | |
| 2009/0271370 A1 | 10/2009 | Jagadish | |
| 2009/0271374 A1 | 10/2009 | Korn | |
| 2009/0276414 A1 | 11/2009 | Gao | |
| 2009/0281988 A1 | 11/2009 | Yoo | |
| 2009/0299963 A1 | 12/2009 | Pippori | |
| 2010/0049802 A1 | 2/2010 | Raman | |
| 2010/0057723 A1 | 3/2010 | Rajaram | |
| 2010/0082695 A1 | 4/2010 | Hardt | |
| 2010/0125562 A1 | 5/2010 | Nair | |
| 2010/0145771 A1 | 6/2010 | Fligler | |
| 2010/0179929 A1 | 7/2010 | Yin | |
| 2010/0197318 A1 | 8/2010 | Petersen | |
| 2010/0228744 A1 | 9/2010 | Craswell | |
| 2010/0235354 A1 | 9/2010 | Gargaro | |
| 2010/0250526 A1 | 9/2010 | Prochazka | |
| 2010/0321399 A1 | 12/2010 | Ellren | |
| 2011/0004609 A1 | 1/2011 | Chitiveli | |
| 2011/0022602 A1 | 1/2011 | Luo | |
| 2011/0078166 A1 | 3/2011 | Oliver | |
| 2011/0087534 A1 | 4/2011 | Strebinger | |
| 2011/0137902 A1 | 6/2011 | Wable | |
| 2011/0184981 A1 | 7/2011 | Lu | |
| 2011/0191371 A1 | 8/2011 | Elliott | |
| 2011/0196855 A1 | 8/2011 | Wable | |
| 2011/0231296 A1 | 9/2011 | Gross | |
| 2011/0276396 A1 | 11/2011 | Rathod | |
| 2011/0313992 A1 | 12/2011 | Groeneveld | |
| 2011/0320470 A1 | 12/2011 | Williams | |
| 2012/0005224 A1 * | 1/2012 | Ahrens | H04W 4/21 707/769 |
| 2012/0042020 A1 | 2/2012 | Kolari | |
| 2012/0047147 A1 | 2/2012 | Redstone | |
| 2012/0059708 A1 | 3/2012 | Galas | |
| 2012/0110080 A1 | 5/2012 | Panyam | |
| 2012/0136852 A1 | 5/2012 | Geller | |
| 2012/0143963 A1 * | 6/2012 | Kennberg | G06Q 10/107 709/206 |
| 2012/0166432 A1 | 6/2012 | Tseng | |
| 2012/0166433 A1 | 6/2012 | Tseng | |
| 2012/0166438 A1 * | 6/2012 | Wu | G06F 16/3322 707/737 |
| 2012/0179637 A1 | 7/2012 | Juan | |
| 2012/0185472 A1 | 7/2012 | Ahmed | |
| 2012/0185486 A1 | 7/2012 | Voigt | |
| 2012/0209832 A1 | 8/2012 | Neystadt | |
| 2012/0221581 A1 | 8/2012 | Narayanan | |
| 2012/0271831 A1 | 10/2012 | Narayanan | |
| 2012/0278127 A1 | 11/2012 | Kirakosyan | |
| 2012/0284329 A1 | 11/2012 | Van Den Oord | |
| 2012/0290950 A1 | 11/2012 | Rapaport | |
| 2012/0310922 A1 | 12/2012 | Johnson | |
| 2012/0311034 A1 | 12/2012 | Goldband | |
| 2012/0317088 A1 | 12/2012 | Pantel | |
| 2012/0331063 A1 | 12/2012 | Rajaram | |
| 2013/0024443 A1 * | 1/2013 | Achuthan | G06Q 30/0201 707/722 |
| 2013/0031106 A1 | 1/2013 | Schechter | |
| 2013/0031113 A1 | 1/2013 | Feng | |
| 2013/0041876 A1 | 2/2013 | Dow | |
| 2013/0066876 A1 | 3/2013 | Raskino | |

(56) References Cited

U.S. PATENT DOCUMENTS

| | | | |
|---|---|---|---|
| 2013/0073400 A1 | 3/2013 | Heath | |
| 2013/0085970 A1 | 4/2013 | Karnik | |
| 2013/0086024 A1 | 4/2013 | Liu | |
| 2013/0086057 A1 | 4/2013 | Harrington | |
| 2013/0097140 A1 | 4/2013 | Scheel | |
| 2013/0124538 A1 | 5/2013 | Lee | |
| 2013/0124542 A1 | 5/2013 | Lee | |
| 2013/0144899 A1 | 6/2013 | Lee | |
| 2013/0191372 A1 | 7/2013 | Lee | |
| 2013/0191416 A1 | 7/2013 | Lee | |
| 2013/0198219 A1 | 8/2013 | Cohen | |
| 2013/0204737 A1 | 8/2013 | Agarwal | |
| 2013/0204833 A1* | 8/2013 | Pang | G06F 16/335 706/52 |
| 2013/0226918 A1 | 8/2013 | Berkhim | |
| 2013/0227011 A1 | 8/2013 | Sharma | |
| 2013/0246404 A1 | 9/2013 | Annau | |
| 2013/0254155 A1 | 9/2013 | Thollot | |
| 2013/0254305 A1 | 9/2013 | Cheng | |
| 2013/0297694 A1* | 11/2013 | Ghosh | H04L 67/02 709/204 |
| 2014/0006416 A1 | 1/2014 | Leslie | |
| 2014/0067535 A1 | 3/2014 | Rezaei | |
| 2014/0081954 A1* | 3/2014 | Elizarov | H04N 21/252 707/722 |
| 2014/0122465 A1 | 5/2014 | Bilinski | |
| 2014/0156996 A1* | 6/2014 | Heppe | G06Q 30/00 713/175 |
| 2014/0215351 A1* | 7/2014 | Gansca | G06Q 50/01 715/751 |
| 2014/0279747 A1* | 9/2014 | Strassner | G06N 99/005 706/12 |
| 2014/0280080 A1 | 9/2014 | Solheim | |
| 2014/0304429 A1 | 10/2014 | Softky | |
| 2014/0330818 A1* | 11/2014 | Raina | G06Q 30/02 707/723 |
| 2014/0344265 A1* | 11/2014 | Boucher | G06F 17/30867 707/732 |
| 2014/0358885 A1* | 12/2014 | Zhou | G06Q 10/101 707/708 |
| 2015/0074289 A1 | 3/2015 | Hyman | |
| 2015/0161519 A1 | 6/2015 | Zhong | |
| 2015/0193889 A1* | 7/2015 | Garg | G06Q 50/01 705/14.49 |
| 2015/0213119 A1* | 7/2015 | Agarwal | G06Q 10/10 707/737 |
| 2015/0286643 A1 | 10/2015 | Kumar | |
| 2015/0363402 A1 | 12/2015 | Jackson | |
| 2016/0026727 A1 | 1/2016 | Bar-Yossef | |
| 2016/0041982 A1 | 2/2016 | He | |
| 2016/0042067 A1 | 2/2016 | Weng | |
| 2016/0063093 A1 | 3/2016 | Boucher | |
| 2016/0063115 A1 | 3/2016 | Ayan | |
| 2016/0162502 A1 | 6/2016 | Zhou | |
| 2016/0188702 A1* | 6/2016 | Lee-Goldman | G06F 16/3322 707/749 |
| 2016/0203238 A1 | 7/2016 | Cherniavskii | |
| 2016/0314113 A1* | 10/2016 | Moharrami | G06F 17/2785 |
| 2016/0357870 A1* | 12/2016 | Hentschel | G06F 16/24575 |
| 2016/0373397 A1* | 12/2016 | Kesten | H04L 51/32 |
| 2017/0195125 A1* | 7/2017 | Heppe | H04L 9/3247 |
| 2017/0272396 A1* | 9/2017 | Chhaya | H04L 51/32 |
| 2019/0036867 A1* | 1/2019 | Chhaya | H04L 51/32 |

* cited by examiner

500

510 410

| hurricane matthew florida coast | 🔍 |

425

Top | Latest | People | Photos | Videos | Pages | Places | Groups | Apps | Events

520 420

Top Posts

Hurricane Matthew battering Florida's northeast coast as governer warns: 'This is not over'
The storm was "hugging" Florida's coast, bringing pounding rain and rain along the state's eastern shores.

8 hours ago • washingtonpost.com

↗ Share

TRENDING

- #Hurricane Matthew
  230K people talking about this
- Concord, California
  18K people talking about this
- Jeffrey Dahmer
  7.8K people talking about this
- Waffle House Index
  3.3K people talking about this
- Haiti
  1M people talking about this
- Mandy Moore
  7.4K people talking about this
- Christian Ponder
  1K people talking about this
- Jacksonville Beach, Florida
  35K people talking about this
- Jared Cook
  2.5K people talking about this
- Southwest Airlines
  480K people talking about this Public Posts 531

Elissa
58 mins

My heart 😢 goes out to everyone who is affected by hurricane Matthew and you all are in my prayers.

This is so so scary 😢 & so devastating to everyone who lives in these areas. Imagine if this was your state, your home & your family...we would want people to help us in even the littlest ways.

👍 😢 14

👍 Like   💬 Comment   ↗ Share

530

Annie
51 mins

532

Public pages like this don't really have a marked safe option. 😊 but I'm safe! 😊 iamsafe.com/hurricane

👍 😢 12

👍 Like   💬 Comment   ↗ Share

John
1 hr

533

While many of the news outlets, especially our local Florida news stations, did a very good job in terms of reporting on hurricane Matthew - before, during, and after it hit - this sort of crazy stuff coming from Shep Smith serves no one!

1 Comment

👍 😐 5

👍 Like   💬 Comment   ↗ Share

FIG.5

SELECTING USER POSTS RELATED TO TRENDING TOPICS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may identify a plurality of high-quality public user posts related to a trending topic and present the identified posts in a commentary module responsive to a selection of the trending topic by a user. The social-networking system may display a list of trending topics on the online social network to a user. The user may be interested in one or more of the listed trending topics and other users' opinions on the trending topics. The user may select a trending topic of interest within a user interface presented by the social-networking system. For a trending topic selected by the user, the social-networking system may identify a plurality of high-quality posts authored by other users of the online social network about the trending topic and display to the user a commentary module containing content associated with one or more of the identified posts. The commentary module may be a component of one or more user interfaces associated with the online social network. The user interfaces may each comprise one or more different modules dedicated to displaying different content items categorized by, for example, format (e.g., text, image, video), author (e.g., users, public figures, news media entities), or method of content identification and ranking (e.g., new content, popular content, informative content). The modules may each be assigned a particular size and a particular position or region within a corresponding user interface. They may alternatively be dynamically organized by the social-networking system. The social-networking system may preferentially select high-quality posts for inclusion in the commentary module. The quality of a post may be defined based on one or more characteristics of the post. In particular embodiments, high-quality posts may be those posts that are determined to have informative content, to express strong sentiments or opinions, to be closely related to the trending topic, or to be fresh or socially relevant. Low-quality posts, on the other hand, may be those posts that are determined to comprise duplicative or meaningless content, to be irrelevant or remotely relevant to the trending topic, to be outdated, or to have received little attention from users of the online social network.

In particular embodiments, a social-networking system may comprise an enormous amount of content of non-uniform quality due to continual contributions from a large number (e.g., billions) of users. This may create particular technical challenges that necessitate technical capabilities for effectively sorting through massive data and identifying and providing to a user high-quality content that are likely to be of interest to the user. Such capabilities may be particularly important for trending topics, which may attract extensive content creation and consumption activities on an online social network. Particular embodiments disclosed herein may provide or enhance such technical capabilities using particular search and machine-learning techniques. Specifically, particular embodiments may allow the social-networking system to efficiently identify posts related to a trending topic, determine the posts' quality or predict their level of interest to a user, and provide a user interface displaying high-quality posts related to the trending topic. As an example and not by way of limitation, particular embodiments may save processing resources of the social-networking system by enabling reuse of search results for trending topics or quality evaluation for posts. As another example and not by way of limitation, particular embodiments may improve user experience and computation efficiency by reducing the number of search queries a user needs to run to obtain posts of interest related to a particular trending topic. The commentary module may provide the user an effective and convenient way to grasp key information and public opinions about trending topics of interest.

In particular embodiments, the social-networking system may receive, from a client system of a user of the online social network, a query associated with a trending topic selected by the user. The social-networking system may rewrite the query into a query command comprising a plurality of query constraints and identify one or more posts matching the query command. The identified posts may all be authored by users of the online social network and have privacy settings making them visible to all users of the online social network. The social-networking system may then score the identified posts using a machine-learning model, which may be configured to take one or more post-quality features as input. The post-quality features associated with a post may be extracted from, for example, text of the post, metadata associated with the post (e.g., time of creation), social signals associated with the post (e.g., likes, comments, reshares), information associated with one or more other posts related to the post, information associated with one or more trending topics associated with the post (e.g., headlines associated with the trending topics), other suitable information, or any combination thereof. The features may characterize, for example, how meaningful or informative the post is, one or more sentiments expressed by the post, relevance of the post with respect to the selected trending topic, temporal relevance of the post with respect to the query and the trending topic, other characteristics, or any combination thereof. The social-networking system may then send a commentary module to the client system of the user for display. The commentary module may comprise content associated with one or more of the highly-scored posts.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 illustrates an example interface displaying an example commentary module comprising example posts.

DESCRIPTION OF EXAMPLE EMBODIMENTS

System Overview

Figure 1:
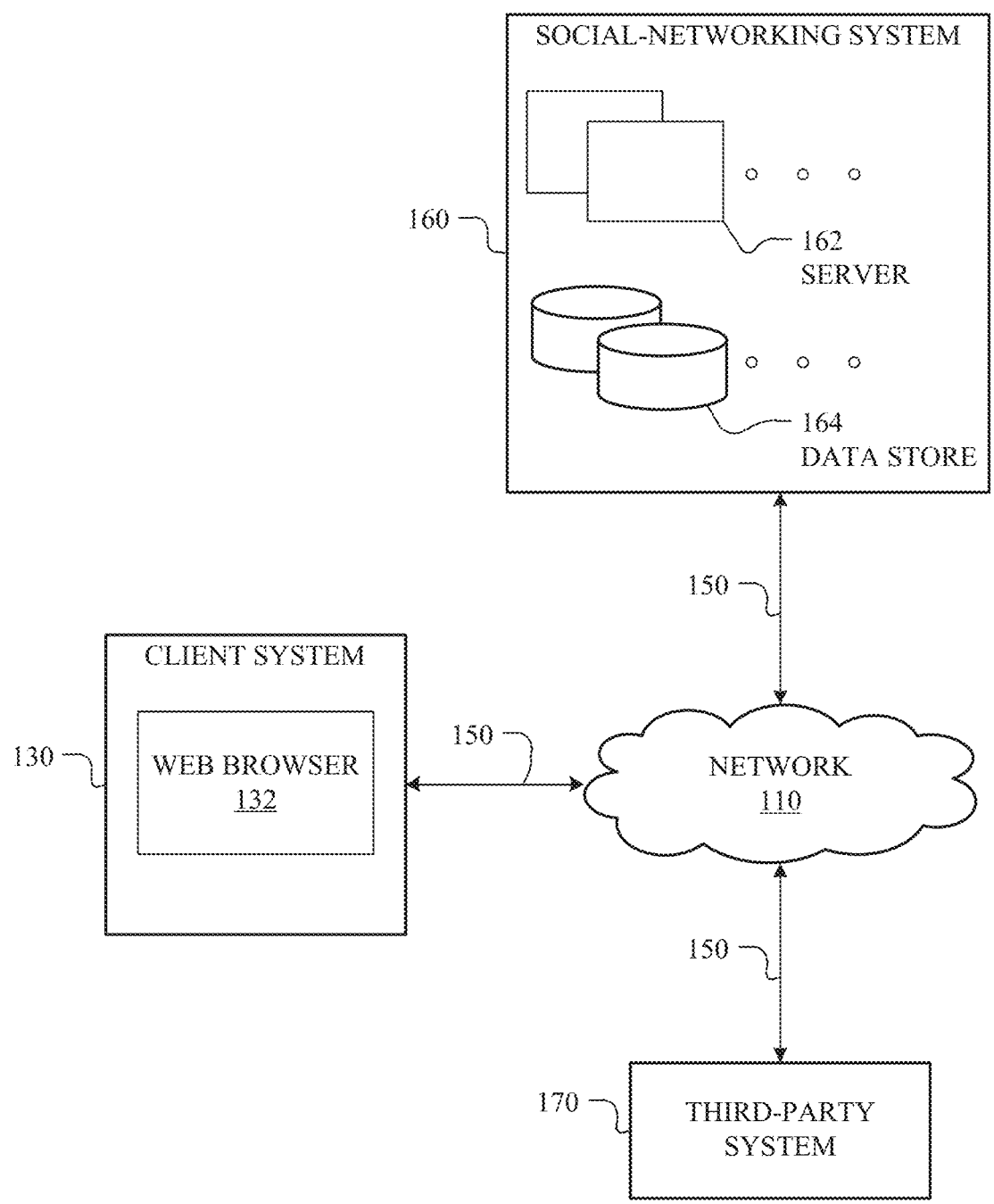
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
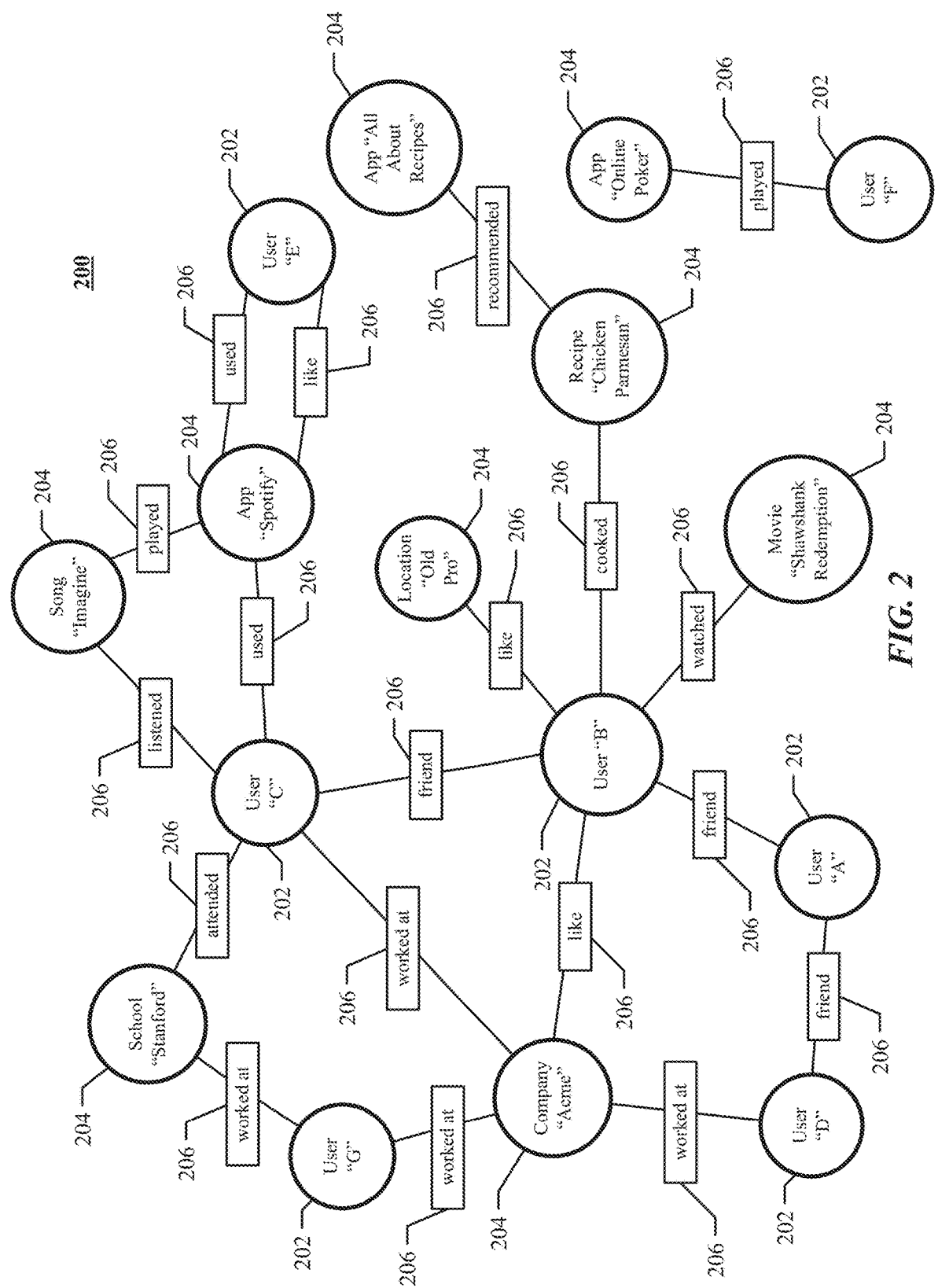
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
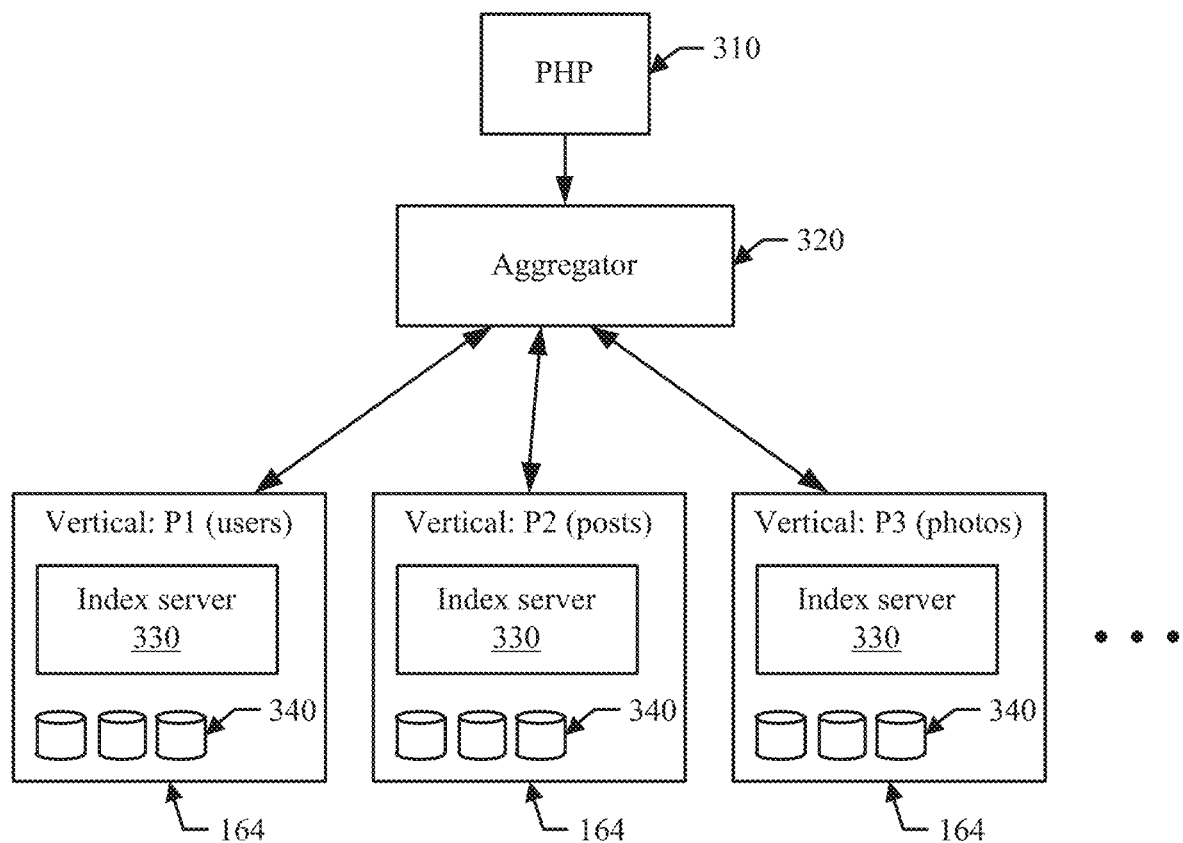
FIG. 3 illustrates an example partitioning for storing objects of social-networking system 160.

FIG. 3 illustrates an example partitioning for storing objects of a social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723, 861, filed 21 Dec. 2012, and U.S. patent application Ser. No. 13/870,113, filed 25 Apr. 2013, each of which is incorporated by reference.

Selecting User Posts Related to Trending Topics

In particular embodiments, the social-networking system 160 may identify a plurality of high-quality public user posts related to a trending topic and present the identified posts in a commentary module responsive to a selection of the trending topic by a user. The social-networking system 160 may identify and compile a list of trending topics on the online social network and cause one or more of the trending topics to be displayed to the user within a user interface associated with the online social network. The user may select one of the trending topics by, for example, clicking on an interactive element associated with the trending topic. This selection of the trending topic may cause the user's client system 130 to send to the social-networking system 160 a corresponding request comprising a query for posts matching the trending topic. The social-networking system 160 may rewrite the query into a query command by, for example, including one or more additional query constraints or replacing one or more n-grams of the query with one or more equivalent n-grams or corresponding identifiers. The social-networking system 160 may use the query command to search against one or more data stores 164 to identify and fetch a plurality of matching posts. The identified posts may all be authored by users of the online social network and have privacy settings making them visible to all users of the online social network (i.e., "public" posts). The social-networking system 160 may then score the identified posts using a machine-learning model, which may be configured to take one or more post-quality features as input. The post-quality features associated with a post may be extracted from, for example, text of the post, metadata associated with the post (e.g., time of creation), social signals associated with the post (e.g., likes, comments, reshares), information associated with one or more other posts related to the post, information associated with one or more trending topics associated with the post (e.g., headlines associated with the trending topics), other suitable information, or any combination thereof. The features may characterize, for example, how meaningful or informative the post is, one or more sentiments expressed by the post, relevance of the post with respect to the selected trending topic, temporal relevance of the post with respect to the query and the trending topic, other characteristics, or any combination thereof. The score calculated for a post may represent a determination of the quality of the post. In particular embodiments, high-quality posts may be those posts that are determined to have informative content, to express strong sentiments or opinions, to be closely related to the trending topic, or to be fresh or socially relevant. Low-quality posts, on the other hand, may be those posts that are determined to comprise duplicative or meaningless content, to be irrelevant or remotely relevant to the trending topic, to be outdated, or to have received little attention from users of the online social network. The social-networking system 160 may then send a commentary module to the client system 130 for display to the querying user. The commentary module may comprise content associated with one or more of the identified posts having above-threshold scores or high-quality posts.

In particular embodiments, a social-networking system 160 may comprise an enormous amount of content of non-uniform quality due to continual contributions from a large number (e.g., billions) of users. This may create particular technical challenges that necessitate technical capabilities for effectively sorting through massive data and identifying and providing to a user high-quality content that are likely to be of interest to the user. Such capabilities may be particularly important for trending topics, which may attract extensive content creation and consumption activities on an online social network. Particular embodiments disclosed herein may provide or enhance such technical capabilities using particular search and machine-learning techniques. Specifically, particular embodiments may allow the social-networking system 160 to efficiently identify posts related to a trending topic, determine the posts' quality or predict their level of interest to a user, and provide a user interface displaying high-quality posts related to the trending topic. As an example and not by way of limitation, particular embodiments may save processing resources of the social-networking system by enabling reuse of search results for trending topics or quality evaluation for posts. As another example and not by way of limitation, particular embodiments may improve user experience and computation efficiency by reducing the number of search queries a user needs to run to obtain posts of interest related to a particular trending topic. The commentary module may provide the user an effective and convenient way to grasp key information and public opinions about trending topics of interest.

As an example and not by way of limitation, the social-networking system 160 may present a list of trending topics in a newsfeed interface displayed to a user. The user may review the listed trending topics and select a trending topic of interest, "Michael Phelps Rio Olympics," (Michael Phelps was a competitive swimmer who won five gold medals in the 2016. Rio Olympic Games) by clicking on a corresponding link. This may cause the user to be transferred to a trending-topic page displaying one or more modules comprising content objects related to the selected trending topic. The modules may each be a user-interface component of the trending-topic page and be assigned a particular size and a particular position or region within the trending-topic page. They may alternatively be dynamically organized within the trending-topic page. The modules may be dedicated to displaying different content items categorized by, for example, format (e.g., text, image, video), author (e.g., users, public figures, news media entities), or method of identification and ranking (e.g., new content, popular content, informative content). The modules may comprise a commentary module, which is the subject matter of particular embodiments disclosed herein. At the same time, the user's selection of the trending topic "Michael Phelps Rio Olympics" may cause the user's client system 130 to send a query "michael phelps rio olympics" to the social-networking system 160 requesting matching posts. In response to this query, a query rewriter process associated with the social-networking system 160 may rewrite the query into a computer readable query command by, for example, including one or more additional query constraints or replacing one or more of its n-grams with equivalent n-grams or corresponding identifiers. For example, the query command may be represented by the expression "phelps, id=<rio oly>, privacy=<public>, author=<users>, language=<English>." This query command may specify and request posts that contain the term "phelps," contain one or more terms corresponding to the identifier <rio oly> (i.e., an identifier corresponding to the topic Rio Olympics), have privacy settings specifying the posts are visible to all users of the online social network (i.e., privacy is set to "public"), are authored by a user, and contain English-language content. The social-networking system 160 may then search one or more data stores 164, identify a plurality of posts matching the query command, and score the posts using a machine-learning model. The matching-learning model may calculate the scores based on a plurality of post-quality features associated with the posts. The post-quality features of a post may indicate how informative, interesting, emotional, relevant, popular, or fresh the post is. Based on the scores, the social-networking system 160 may send to the client system 130 a commentary module comprising one or more posts for display to the user. For example, the posts in this case may comprise a user's comments celebrating Phelps' new Olympics gold metal, a user's article predicting Phelps' performance in the 2016. Olympic Games, and a user's comments grieving about his country's swimmer's loss to Phelps. The user may view the posts included in the commentary module and scroll down to view more posts related to the selected trending topic. Although this disclosure describes identifying posts related to a trending topic and presenting the posts in a commentary module in a particular manner, this disclosure contemplates identifying posts related to a trending topic and presenting the posts in a commentary module in any suitable manner.

Figure 4:
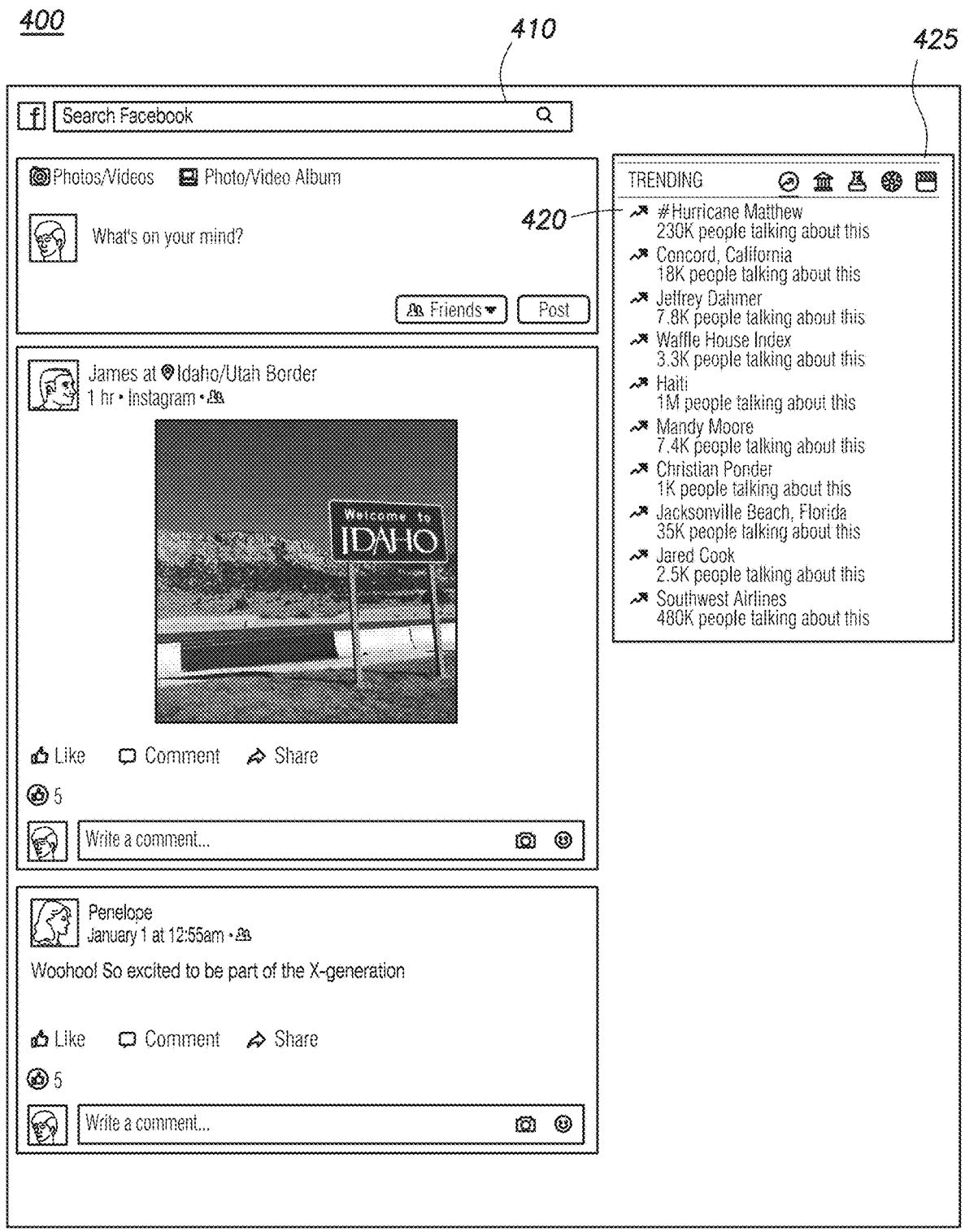
FIG. 4 illustrates an example interface displaying example trending topics.

FIG. 4 illustrates an example interface displaying example trending topics. In particular embodiments, the social-networking system 160 may identify a plurality of topics that are trending on the online social network at the moment and compile the identified topics into a list of trending topics. The social-networking system 160 may send a user interface 400 comprising a topics module 420 to a client system 130 of a user for display. The user interface 400 may be, for example, a newsfeed interface associated with the user. The topics module 420 may comprise a plurality of trending topics identified by the social-networking system 160. The trending topics may comprise people (e.g., Jeffrey Dahmer, Mandy Moore), places (e.g., Concord, Haiti, Jacksonville Beach), events (e.g., Hurricane Matthew), other topics (e.g., Waffle House Index), or any combination thereof. The trending topics displayed in the topics module 420 may be organized in a ranked order based on social activities associated with trending topics. For each trending topic, the social-networking system 160 may display the text of the trending topic along with additional information about the trending topic such as, for example, an indication of the popularity of the trending topic (e.g., "230K people talking about this"). The user interface 400 may also comprise a topic category menu 425 comprising one or more icons representing different categories of topics (e.g., "politics," "science and technology," "sports"). The user may click on one of the icons to view topics belonging to the respective category. The user may view the displayed trending topics and select one of them (e.g., Hurricane Matthew) by, for example, clicking on a link associated with the trending topic. After selecting the trending topic, the user may be transferred to another user interface (e.g., a trending-topic page associated with the selected trending topic) displaying a commentary module. Although FIG. 4 illustrates displaying particular topics in a particular user interface in a particular manner, this disclosure contemplates displaying any suitable topics in any suitable user interface in any suitable manner.

FIG. 5 illustrates an example interface displaying an example commentary module comprising example posts. In particular embodiments, the user's selection of the trending topic Hurricane Matthew may cause the user's client system 130 to send a corresponding query to the social-networking system 160. The social-networking system 160 may rewrite the query into a query command and identify a plurality of posts matching the selected trending topic based on the query command. The social-networking system 160 may send a user interface 500 to the user's client system 130 for display. The user interface 500 may comprise a query field 410 displaying the query received or executed by the social-networking system 160 (e.g., "hurricane matthew florida coast") responsive to the user's selection of the trending topic. The user interface 500 may also comprise the topics module 420, such that the user may view or select one or more other trending topics. The user interface 500 may further comprise one or more content modules. The content modules displayed may be controlled by a menu bar 510. In particular embodiments, the user interface 500 may comprise a top-posts module 520, which may display one or more posts associated with the selected trending topic that are determined to be most popular among users of the online social network. For example, the top-posts module 520 may comprise a news article "Hurricane Matthew battering Florida's northeast coast as governor warns: 'This is not over.' The social-networking system 160 may have included the news article post in the top-posts module 520 based on social signals (e.g., a large number of likes, comments, or reshares) associated with the post.

The user interface 500 may also comprise a commentary module 530 entitled "Public Posts." In the example illustrated in FIG. 5, the commentary module 530 may comprise at least three content objects 531, 532, and 533. The posts 531, 532, and 533 may each be authored by a user of the online social network and be made publicly available. They may each have been identified and fetched by the social-networking system 160 based on the query received from the querying user's client system 130. Each post may also have a score calculated by the social-networking system 160 based on a machine-learning model. Their locations within the commentary module 530 may be based on their respective scores. The posts 531, 532, and 533 may be included in the commentary module 530 in their entirety. They may alternatively be partially included in the commentary module 530. The included content for each post may comprise, for example, a name of an author of the post, a time of creation for the post, or an excerpt from the text of the post. The excerpt may comprise text content (as in the posts 531, 532, and 533), non-text content (e.g., emoticons in the posts 531 and 532), references to other content objects (e.g., URL in the post 532), other suitable content, or any combination thereof. Furthermore, one or more sentiments may be determined based on particular phrases used by the posts (e.g., "my heart goes out," "scary" in the post 531, "safe" in the post 532, "good," "crazy" in the post 533). Such sentiments may be used as features in scoring the posts. Although FIG. 5 illustrates displaying particular posts in a particular user interface in a particular manner, this disclosure contemplates displaying any suitable posts in any suitable user interface in any suitable manner.

In particular embodiments, the social-networking system 160 may receive a query from a client system 130 of a user of the online social network. The query may first arrive at a top-level aggregator of a search engine associated with the social-networking system 160. In particular embodiments, the query may be associated with a trending topic selected by the user from a plurality of trending topics. The query may comprise one or more terms associated with the selected trending topic. It may be in the form of a request related to the user's selection of the trending topic. As an example and not by way of limitation, the user may select a trending topic "Michael Phelps Rio Olympics" within a user interface associated with the online social network. The client system 130 may generate a query "michael phelps swimmer," which contains two terms of the trending topic, and send the query to the social-networking system 160. As another example and not by way of limitation, the user may select a trending topic "Hurricane Matthew" within a user interface associated with the online social network. The client system 130 may generate a query "hurricane matthew" directly using the selected trending topic and send the query to the top-level aggregator of a search engine associated with the online social network.

In particular embodiments, the social-networking system 160 may continuously detect the activities of a plurality of users of the online social network such as, for example, searching, posting, commenting, sharing, another suitable activity, or any combination thereof. The detecting may be subject to privacy settings of each of the users involved. By doing so, the social-networking system 160 may identify a plurality of topics that are trending on the online social network at the moment. The topics may comprise people, places, events, other topics, or any combination thereof, which may be provided by a topic tagger service associated with the online social network. The trending nature of a topic may be indicated by an uptick in social-networking activities related to the topic. The identified topics may be compiled into a list of trending topics. Whether a particular topic is trending (e.g., in terms of a level of popularity of the topic) may be characterized by a function of any combination of one or more factors corresponding to the activities detected. As an example and not by way of limitation, the function for characterizing the level of popularity p of a particular topic may be represented by the following expression: $p=f_{t_1 \to t_2}(m_1, m_2, m_3)$, where $m_1$, $m_2$, and $m_3$ correspond to the number of searches, posts, and comments related to the topic on the online social network, respectively. The variables $m_1$, $m_2$, and $m_3$ may be evaluated within a specified timeframe from a time $t_1$ to a time $t_2$. The function may return a positive number if and only if the level of popularity of the topic meets a specified threshold such that the topic is eligible of being included in the trending-topic list. The function may return zero or a negative number otherwise. As another example and not by way of limitation, the variables $m_1$, $m_2$, and $m_3$ in the function $p=f_{t_1 \to t_2}(m_1, m_2, m_3)$ discussed above may correspond to rates of change for different types of activities on the online social network rather than the count of the number of these activities. Such a function may be specifically suitable for detecting upticks or spikes in social-networking activities associated with a particular topic. The social-networking system 160 may update the trending-topic list frequently so that it accurately represents the "trend" on the online social network. More information on trending topics may be found in U.S. patent application Ser. No. 14/858,366, filed 18 Sep. 2015, which is incorporated by reference.

In particular embodiments, the social-networking system 160 may send a user interface comprising a plurality of trending topics to the client system 130 of the user for display. The trending topics may be displayed on a webpage associated with the online social network accessed by a web browser 132 on the client system 130. The trending topics may alternatively be displayed in a user interface associated with an application corresponding to the social-networking system 160 that is installed on the client system 130 of the user. The user interface comprising the trending topics may further comprise one or more other content items associated with the user or the online social network. As an example and not by way of limitation, the user interface may be a newsfeed interface comprising a plurality of newsfeed content items for the user. The trending topics may be displayed within a sidebar of the newsfeed interface. For each trending topic, the social-networking system 160 may display the text of the trending topic along with additional information about the trending topic such as, for example, a category of the trending topic (e.g., "politics," "science and technology," "sports") or an indication of the popularity of the trending topic (e.g., "79K people talking about this"). Within the user interface, the trending topics may be organized in a ranked order based on social activities associated with the trending topics. The user may view the displayed trending topics and select a trending topic by, for example, clicking on a link associated with the trending topic. Responsive to the user's input, the client system 130 may generate a query for content matching the trending topic and send the query to the social-networking system 160. After selecting the trending topic, the user may be transferred to another user interface (e.g., a trending-topic page) displaying a commentary module 530. The commentary module 530 may comprise one or more public posts related to the selected trending topic. The public posts included in the commentary module 530 may each contain commentaries by users of the online social network on the selected trending topic. Although this disclosure describes receiving particular queries associated with particular trending topics in a particular manner, this disclosure contemplates receiving any suitable queries associated with any suitable trending topics in any suitable manner.

In particular embodiments, the social-networking system 160 may rewrite the query into a query command comprising a plurality of query constraints. In particular embodiments, one of the query constraints may specify posts having privacy settings making the posts visible to all users of the online social network. The query command may comprise a computer-readable string of structured text. It may comprise one or more terms of the query, one or more terms created by the social-networking system 160, or one or more constraints added by the social-networking system 160. In particular embodiments, the social-networking system 160, in rewriting a query into a query command, may replace at least one n-gram of the query with an equivalent n-gram or an identifier corresponding to the n-gram. As an example and not by way of limitation, a query "kobe bryant retirement" received by the social-networking system 160 may comprise the n-gram "kobe bryant" (name of a professional basketball player). In rewriting the query into a query command, the social-networking system 160 may replace the n-gram with one or more of the n-grams "kobe," "bryant," "kobe b. bryant," or "black mamba" (nickname of Kobe Bryant). As another example and not by way of limitation, the social-networking system 160 may replace the n-gram "kobe bryant" with a corresponding identifier. The social-networking system 160 may generate and store one or more identifiers for each of one or more entities on the online social network. Identifiers may be readable by the social-networking system 160 as references to social-graph entities. The basketball player Kobe Bryant might be such an entity, which may be associated with a public figure profile interface on the online social network. The one or more identifiers generated and stored in relation to the entity Kobe Bryant may comprise, for example, a text string (e.g., "kb"), a serial number (e.g., "19541"), an identifier of another suitable format, or any combination thereof. By replacing the n-gram "kobe bryant" with an identifier, the social-networking system 160 may rewrite the query "kobe bryant retirement" into a query command represented by, for example, "id=<kb>, retirement."

In particular embodiments, the social-networking system 160 may rewrite a query into a query command by including one or more query constraints (e.g., filters) in the query command. Such query constraints may each specify one or more characteristics of objects on the online social network. A query constraint may specify, for example, a type of objects (e.g., posts), a timeframe for the creation of posts, a language of posts, a type of entities as authors of posts, another suitable characteristic, or any combination thereof. The query constraint, when included in a query command, may function as a filter that is capable of excluding one or more of, for example, old posts (e.g., posts failing a recency threshold, posts disfavored by a recency-bias factor), foreign-language posts (e.g., posts written in a language different from a language associated with the querying user), posts created by non-user entities (e.g., posts created by news media, publishers, or topic pages), non-public posts (e.g., posts not visible to the querying user), posts containing objectionable content (e.g., posts with violent images), or other suitable posts. The query constraints to be included in a query command may be pre-determined based on the nature of a functionality of the social-networking system 160. They may alternatively be determined based on the query associated with the query command. As an example and not by way of limitation, the social-networking system 160 may only present public posts or posts with privacy settings making the posts accessible or visible to all users of the online social network in commentary modules 530. It may further require that each post in a commentary module 530 be authored by users of the online social network and not by media, celebrities, or other kinds of public entities. The social-networking system 160 may further record or determine that the querying user's only language is English. In rewriting a query "kobe bryant retirement" for the commentary module functionality, the social-networking system 160 may automatically include three additional query constraints and create a query command represented by the expression "kobe bryant retirement, privacy=<public>, author=<users>, language=<English>." As another example and not by way of limitation, the social-networking system 160 may infer a recency query constraint from the query "rio olympics August 12" and create a query command represented by "rio olympics, time=<08/12/2016>." Such a query command may only quest for posts created on 12 Aug. 2016.

The social-networking system 160 may apply one or more of the aforementioned techniques to rewrite a query into a query command. As an example and not by way of limitation, a client system 130 of a user may receive the user's selection of a trending topic "michael phelps rio olympics" and send a corresponding query "michael phelps rio olympics" to the social-networking system 160. The social-networking system 160 may replace one or more n-grams of the query with one or more equivalent n-grams or corresponding identifiers. It may further add one or more query constraints in structuring the query command. For example, one or more query commands created by the social-networking system 160 in relation to the query "michael phelps rio olympics" may be represented by the expressions "phelps rio olympics, privacy=<public>, author=<users>, language=<English>," "intersect (id=<mp2>, id=<rio oly>), time=<after 08/04/2016>," "phelps, 2016 olympics, privacy=<public>, author=<users>," or expressions representing other suitable query commands. Although this disclosure describes rewriting particular queries into particular query commands in a particular manner, this disclosure contemplates rewriting any suitable queries into any suitable query commands in any suitable manner.

In particular embodiments, the social-networking system 160 may identify one or more posts matching the query command. Each identified post may have privacy settings making the post visible to all users of the online social network. The social-networking system 160 may comprise a search engine. It may search one or more data stores 164 using the query command to identify content objects matching the terms in the query command or satisfying the query constraints of the query command. In particular embodiments, the search engine may be configured to identify only those content objects that satisfy each query constraint of the query command. Alternatively, the search engine may be configured to also identify content objects that satisfy one or more but not all of the query constraints. In particular embodiments, the social-networking system may use the search engine to execute the query command against a post data store or vertical 164 to identify only posts on the online social network. It may further limit identifiable posts to those having privacy settings making them accessible or visible to all users of the online social network. The social-networking system 160 may fetch the identified posts from the post vertical 164 based on a post protocol, such that the identified posts may be incorporated in a commentary module 530 and sent to the querying user's client system 130 for display. Although this disclosure describes identifying particular posts in a particular manner, this disclosure contemplates identifying any suitable posts in any suitable manner.

In particular embodiments, the social-networking system 160 may calculate a score for each of the identified posts. The score may represent a determined quality of its corresponding post. In particular embodiments, posts with higher scores may be those posts that are determined to have informative content, to express strong sentiments or opinions, to be closely related to the trending topic, or to be fresh or socially relevant. Posts with lower scores, on the other hand, may be those posts that are determined to comprise duplicative or meaningless content, to be irrelevant or remotely relevant to the trending topic, to be outdated, or to have received little attention from users of the online social network. A user may be more likely to interact with a highly-scored post than a lowly-scored post. The score may be calculated based on one or more post-quality features associated with the post. In particular embodiments, the social-networking system 160 may calculate the score using a machine-learning model. The machine-learning model may assign a particular weight to each of the one or more post-quality features associated with the post. The machine-learning model may be supervised or unsupervised. It may have been trained using a training data set. The training data set may comprise information associated with a plurality of posts on the online social network. The machine-learning model may apply one or more machine-learning techniques such as, for example, decision tree learning, association rule learning, deep learning, inductive logic programming, reinforcement learning, another suitable machine-learning technique, or any combination thereof. The machine-learning model may be configured to perform one or more functions such as, for example, classification, regression, clustering, another suitable function, or any combination thereof. The machine-learning model may comprise a loss function. The value of the loss function may be minimized when applying the machine-learning model to the training data set.

In particular embodiments, the machine-learning model may be configured to process input feature vectors. A feature vector may be an n-dimensional vector of numerical features representing an object (e.g., a post). The feature vector may exist in a feature space. Each dimension of the feature space may correspond to an artificially defined concept or a variable or characteristic derived by the machine-learning model based on the training data set. Each feature vector may be mapped via the machine-learning model to a resulting value. The relationship between the resulting value and the feature vector may be expressed by a linear function, wherein each term of the function corresponds to a term of the feature vector and comprises a coefficient. The relationship between the resulting value and the feature vector may alternatively be expressed by another type of function. The machine-learning model may assign a particular weight to each of the features of the feature vector representing a post. As an example and not by way of limitation, a function mapping from a feature vector associated with a post to a score calculated for the post by the machine-learning model may be represented by the following expression: $c = A f_1(m_1) + B f_2(m_2) + C f_3(m_3)$, where $m_1$, $m_2$, and $m_3$ are three different post-quality features, and where A, B, and C are weights assigned to the post-quality features, respectively.

In particular embodiments, the social-networking system 160 may extract one or more features from a feature data set associated with each of the identified posts. It may extract a feature of a post by, for example, calculating a value associated with the post, determining a characteristic of the post, or analyzing data associated with the post. The features extracted from the feature data set may correspond to one or more concepts artificially defined by developers of the machine-learning model (e.g., developers of particular functionalities disclosed herein). They may alternatively correspond to one or more variables or characteristics derived by the machine-learning model based on the training data set. In particular embodiments, one or more machine-learning techniques (e.g., deep learning) may be used to derive the features. One or more of the post-quality features associated with each of the identified posts may thus be extracted using a deep-learning algorithm. The social-networking system 160 may then generate, based on the extracted features, a feature vector for the post. The feature data set, from which features associated with a post are extracted, may comprise, for example, text of the post, metadata associated with the post (e.g., time of creation), social signals associated with the post (e.g., likes, comments, reshares), information associated with one or more other posts related to the post, information associated with one or more trending topics associated with the post (e.g., headlines associated with the trending topics), other suitable information, or any combination thereof. In particular embodiments, the features associated with a particular post may comprise one or more query-independent features or one or more query-dependent features. Query-independent features associated with a post may be determined offline or prior to scoring of the post. Query-dependent features, on the other hand, may be determined in real time based at least in part on the trending topic selected by the querying user.

In particular embodiments, the post-quality features associated with each of the identified posts may comprise one or more features characterizing how meaningful or informative the post is. Such post-quality features may comprise one or more of, for example, a length of the post, an amount of text in the post determined to be unique, an amount of non-text content (e.g., emoticons) included in the post, a number of references to other posts (e.g., hashtags, reshares, URLs) included in the post, a social signal associated with the post, or another suitable feature. These post-quality features may be query-independent features that may be pre-determined and stored in association with the post. As an example and not by way of limitation, the social-networking system 160 may compare the content of a post with the content of one or more other posts and determine an amount of text in the post that does not appear in the compared posts. A lengthy post with a large amount of unique text may be determined to be meaningful and informative. The social-networking system 160 may calculate a higher score for a post with substantial length, especially if the post contains a large amount of text that is determined to be unique. Alternatively or additionally, the social-networking system 160 may compare the length of a post or the amount of unique text contained in the post with one or more threshold values and calculate a higher score for the post if the threshold values are satisfied. As another example and not by way of limitation, the social-networking system 160 may determine an amount of non-text content (e.g., emoticons) or a number of references to other posts included in the post. A large amount of non-text content or references to other posts may indicate that the post is of low quality. The social-networking system 160 may calculate a lower score for such a post. As yet another example and not by way of limitation, the social-networking system 160 may use social signals associated with a post as features to calculate the score for the post. A post that has received a large number of likes, comments, or reshares is likely to be of high quality and may be assigned a higher score.

In particular embodiments, the social-networking system 160 may classify the identified posts into one or more quality-based categories based on one or more post-quality features associated with the respective posts. The classification may be performed using the machine-learning model based on one or more of the features described above. In particular embodiments, the machine-learning model may classify the identified posts into good commentaries, which are determined to be high-quality, meaningful, and informative, and bad commentaries otherwise. In particular embodiments, the machine-learning model may classify the posts into categories such as great commentaries, good commentaries, duplicate text, low-quality text, and foreign-language posts. As an example and not by way of limitation, the social-networking system 160 may infer that a particular post is of high quality because it is of substantial length, includes a large amount of unique text, and includes a smaller number of non-text content or references to other posts. Based on the machine-learning model, such a post may be classified as a great or good commentary. It is likely to contain interesting and originally-created information about the trending topic selected by the user and is unlikely to be a low-quality "information-dump" by its author. As another example and not by way of limitation, a post may merely comprise an URL referencing another post and a two-line excerpt from the referenced post. Such a post may be categorized as bad commentary or duplicate text based on the machine-learning model. In particular embodiments, the social-networking system 160 may display to the user only those posts that are assigned to particular high-quality classes or categories. The social-networking system 160 may also increase or decrease the score calculated for a particular post based on a category that the post belongs to.

In particular embodiments, the post-quality features associated with each of the identified posts may comprise one or more features characterizing one or more sentiments associated with the post. These post-quality features may be query-independent features that may be pre-determined and stored in association with the post. Specifically, one of the post-quality features for a post may correspond to a core sentiment associated with the post. The core sentiment may be described as positive or negative. It may alternatively or additionally be described as, for example, happy, sad, disappointed, angry, shocked, another suitable sentiment, or any combination thereof. One or more numerical values may be assigned to describe each sentiment. The numerical values may further describe a strength of the sentiment expressed in the post. As an example and not by way of limitation, the core sentiment value of [2, 1] may represent weak sadness as expressed in a post, wherein the 2 represents sadness and the 1, on a scale of 1-5, indicates a low strength of the sentiment. As another example and not by way of limitation, the core sentiment value of [1, 5] may represent strong happiness as expressed in a post, wherein the 1 represents happiness and the 5 indicates a high strength of the sentiment. In particular embodiments, the social-networking system 160 may extract sentiment-related features of a post from the content of the post. It may search the content of the post to identify emotion-related phrases or keywords and analyze the identified phrases or keywords to extract one or more sentiments expressed by the post. The social-networking system 160 may identify one sentiment most extensively or explicitly expressed by the post as the core sentiment of the post. The social-networking system 160 may further identify one or more sentiments other than the core sentiment and extract one or more features based on the other sentiments. Alternatively or additionally, the social-networking system 160 may further extract or infer one or more sentiments associated with a post using a sentiments classifier or sentiments-module. More information on determining sentiments expressed by posts may be found in U.S. patent application Ser. No. 15/014,846, filed 3 Feb. 2016, which is incorporated by reference.

In particular embodiments, the social-networking system 160 may classify the identified posts into one or more sentiment-based categories based on the core sentiments associated with the respective posts. The posts may also be tagged based on the sentiments they express. The tags may be created by the social-networking system 160 based on text analysis or be manually created by creators or readers of the posts. One or more tags associated with a post may each describe a sentiment expressed by the post. In particular embodiments, the social-networking system 160 may selectively display to the user posts having particular sentiment features, belonging to particular sentiment categories, or having particular sentiment tags. The social-networking system 160 may also increase or decrease the score calculated for a particular post based on sentiment-related features, categories, or tags associated with the post. As an example and not by way of limitation, the social-networking system 160 may calculate a higher score for a post expressing a strong sentiment than a post expressing a light sentiment. As another example and not by way of limitation, the social-networking system 160 may calculate a higher score for a post which shares a core sentiment with a majority of other identified posts. The post may be determined to be informative because it is representative of a large number of other posts at least in terms of the sentiment it expresses.

In particular embodiments, the post-quality features associated with each of the identified posts may comprise one or more features characterizing the relevance of the post to the trending topic selected by the user. Such post-quality features may comprise one or more of, for example, a degree of matching between the post and the trending topic based on a probabilistic retrieval framework analysis of the post and the first trending topic, a degree of similarity between the post and the trending topic based on a comparison of vector representation of the post and the trending topic, a number of components of the post that match the first trending topic, matching of a content object referenced by the post with a headline stored in association with the trending topic, matching of a topic associated with the post with the trending topic, or another suitable feature. These post-quality features may be query-dependent features that may have to be determined in real time based at least in part on the selected trending topic.

As an example and not by way of limitation, the social-networking system 160 may conduct Okapi BM25 analysis of multiple identified posts with respect to the trending topic selected by the user and rank the posts based on how well each matches with the selected trending topic. A greater score may be calculated for a post that ranks higher based on the Okapi BM25 analysis. As another example and not by way of limitation, the social-networking system 160 may embed each of the posts and the trending topic selected by the user into a vector space using a technique such as Word2vec and compare the vector representations of the post and the trending topic to determine their similarity. A post that is determined to be more similar to the selected trending topic may be assigned a higher score. As another example and not by way of limitation, the social-networking system 160 may access different components of a post (e.g., title, author, headline, main content), compare each component of the post with the selected trending topic, and determine a number of components of the post that match at least one n-gram of the trending topic. The social-networking system 160 may calculate a higher score for a post that has multiple components each at least partially matching the trending topic. As another example and not by way of limitation, the social-networking system 160 may store, for each trending topic, a one-sentence headline associated with the trending topic. The social-networking system 160 may access a content object referenced by a post (e.g., via a URL) and determine whether text of the referenced content object matches the headline associated with the trending topic. If so, the social-networking system 160 may calculate a higher score for the post. As yet another example and not by way of limitation, the social-networking system 160 may comprise a topic tagger functionality, which may analyze the content of a post and determine one or more topics associated with the post. More information on determining topics of posts may be found in U.S. patent application Ser. No. 13/167,701, filed 24 Jun. 2016, which is incorporated by reference. The social-networking system 160 may determine a level of matching between one or more topics associated with a post with the trending topic selected by the querying user and calculate the score for the post based on this level of matching.

In particular embodiments, the post-quality features associated with each of the identified posts may comprise one or more features characterizing a recency of the post. Such post-quality features may comprise one or more of, for example, an age of the post, a duration of time between when the post was created and when the first trending topic was identified to be trending, or another suitable feature. These post-quality features may be query-dependent features that may have to be determined in real time. In particular embodiments, the social-networking system 160 may preferentially score a more recent post over an older post in calculating their scores. Alternatively or additionally, the social-networking system 160 may preferentially score a post that temporally correlates closely with the trending topic selected by the user. As an example and not by way of limitation, the social-networking system 160 may calculate a higher score for a post that was created one day ago than a post that was created one year ago as the former is more recently created and is more likely to be relevant to the querying user's interest. As another example and not by way of limitation, the user may have selected the trending topic "Rio Olympics," which was held from 5 Aug. 2016 to 21 Aug. 2016. The topic "Rio Olympics" may have become trending on the online social network since 5 Aug. 2016. The social-networking system 160 may calculate a higher score for a post that was created in August 2016 during the Olympic Games than a post that was created in October 2016 because the former, although less recent, has a closer temporal relationship with the events underlying the selected trending topic or a closer temporal relationship with the date when the selected topic became trending. Although this disclosure describes calculating scores for identified posts in a particular manner, this disclosure contemplates calculating scores for identified posts in any suitable manner.

In particular embodiments, the social-networking system 160 may send, to the client system 130 of the user for display in response to the user selecting the trending topic, a commentary module 530 comprising at least a portion of each of one or more of the identified posts having scores higher than a threshold score. The social-networking system 160 may store a pre-determined threshold score. It may alternatively generate the threshold score in real time based on the scores calculated for the identified posts. The threshold score may have an absolute value or a dynamic value. The dynamic value may be defined such that a certain number of top-ranked posts (e.g., top 7) are sent to the client system 130. The social-networking system 160 may compare the score calculated for each of the identified posts with the threshold score and identify those posts that have scores greater than the threshold score. The commentary module 530 may be displayed on a webpage associated with the online social network accessed by a web browser 132 on the client system 130 of the querying user. The commentary module 530 may alternatively be displayed in a user interface associated with an application corresponding to the social-networking system 160 that is installed on the client system 130 of the querying user. After the user selects a trending topic, the client system 130 may transfer the user to a user interface (e.g., a trending-topic page) displaying the commentary module 530. The user interface may further comprise one or more other modules such as, for example, a module comprising most-visited posts associated with the selected trending topic, a module comprising latest posts, a module comprising exclusively posts by users within the querying user's social circle, a module comprising multimedia content objects, or other suitable modules.

In particular embodiments, the commentary module 530 may comprise one or more of the identified posts associated with the selected trending topic. The social-networking system 160 may include in the commentary module 530 only posts that satisfy one or more threshold requirements. As an example and not by way of limitation, the social-networking system 160 may require a minimum level of relevance between a post and the selected trending topic, as indicated by relevant post-quality features, before including the post in the commentary module 530. As another example and not by way of limitation, the social-networking system 160 may only include posts created within a particular timeframe in the commentary module 530. As yet another example and not by way of limitation, the social-networking system 160 may only display posts in a language spoken by the user in the commentary module 530. In particular embodiments, the posts within the commentary module 530 may be presented in ranked order based on the score of each of the posts. A post having a higher score may be displayed at a more noticeable position within the commentary module 530 (e.g., at the top of the commentary module 530). Alternatively, the posts within the commentary module 530 may be ordered based on one or more features associated with the posts. As an example and not by way of limitation, the posts may be ordered by the recency of their creation.

In particular embodiments, the commentary module 530 may be operable to retrieve one or more additional posts for display responsive to the user requesting to view additional posts. As an example and not by way of limitation, the commentary module 530 may comprise an infinite scrolling functionality, such that a user may scroll down the commentary module 530 to view posts that are not presently displayed in the commentary module 530. The commentary module 530 may interpret the user's scrolling down to the end of the commentary module 530 as a request to view additional posts. It may retrieve one or more additional posts for display responsive to the user's request. The additional posts may be retrieved from one or more data stores associated with the user's client system 130 or one or more data stores 164 associated with the social-networking system 160. As another example and not by way of limitation, the user may interact with an interactive element (e.g., a "View More" button) within the commentary module 530 to request viewing more posts. The commentary module 530 may retrieve and display additional posts in response to the user's interaction with the interactive element.

In particular embodiments, the commentary module 530 may comprise an entirety of at least one of the identified posts having a score higher than the threshold score. The social-networking system 160 may include identified posts in their entirety in the commentary module 530. Alternatively or additionally, the commentary module 530 may comprise an excerpt of at least one of the identified posts having a score higher than the threshold score. The social-networking system 160 may generate, for each of one or more of the identified posts, a content object containing excerpts from the post or a compressed version of the post and include the content object or compressed post in the commentary module 530. The generated content object may comprise one or more components of the post (e.g., title, author, headline, image), an excerpt from the main content of the post, a link to the post, other suitable content, or any combination thereof. The user may interact with one or more elements of the generated content object within the commentary module 530 to be transferred to a user interface displaying the post in its entirety. Although this disclosure describes sending a commentary module in a particular manner, this disclosure contemplates sending a commentary module in any suitable manner.

Figure 6:
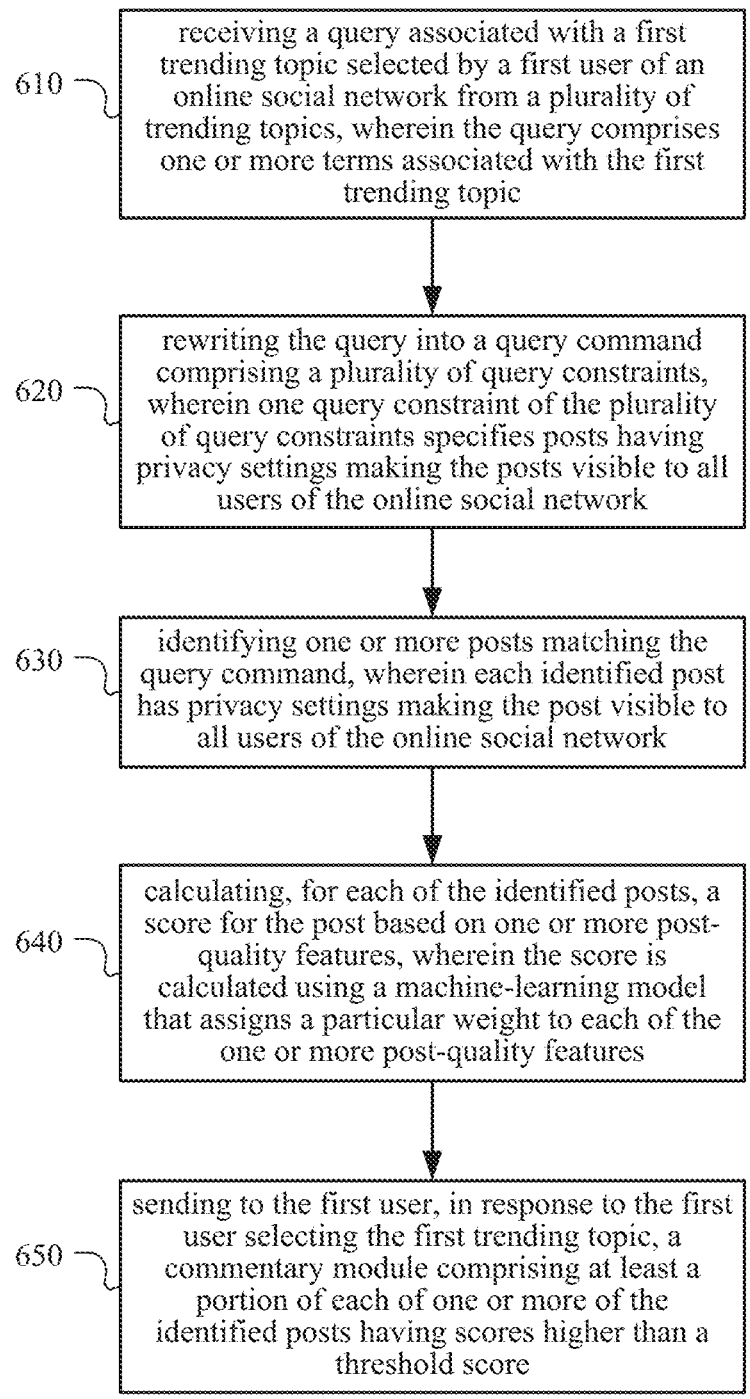
FIG. 6 illustrates an example method 600 for identifying posts related to a trending topic and presenting the posts in a commentary module.

FIG. 6 illustrates an example method 600 for identifying posts related to a trending topic and presenting the posts in a commentary module. The method may begin at step 610, where the social-networking system 160 may receive a query associated with a first trending topic selected by a first user of an online social network from a plurality of trending topics, wherein the query comprises one or more terms associated with the first trending topic. At step 620, the social-networking system 160 may rewrite the query into a query command comprising a plurality of query constraints, wherein one query constraint of the plurality of query constraints specifies posts having privacy settings making the posts visible to all users of the online social network. At step 630, the social-networking system 160 may identify one or more posts matching the query command, wherein each identified post has privacy settings making the post visible to all users of the online social network. At step 640, the social-networking system 160 may calculate, for each of the identified posts, a score for the post based on one or more post-quality features, wherein the score is calculated using a machine-learning model that assigns a particular weight to each of the one or more post-quality features. At step 650, the social-networking system 160 may send to the first user, in response to the first user selecting the first trending topic, a commentary module 530 comprising at least a portion of each of one or more of the identified posts having scores higher than a threshold score. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for identifying posts related to a trending topic and presenting the posts in a commentary module including the particular steps of the method of FIG. 6, this disclosure contemplates any suitable method for identifying posts related to a trending topic and presenting the posts in a commentary module including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 7:
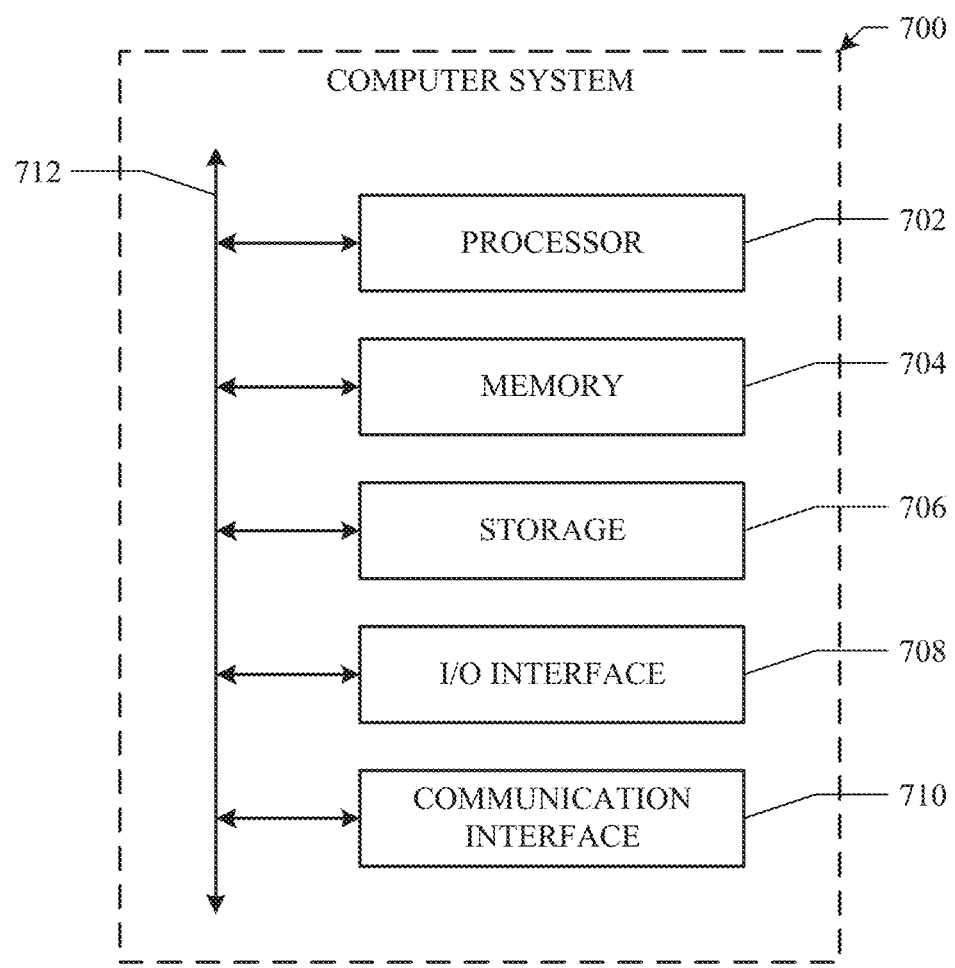
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   receiving, from a client system of a first user of an online social network, a query comprising one or more terms;
   determining a first trending topic of a plurality of trending topics associated with one or more of the terms of the query;
   rewriting the query into a query command comprising a plurality of query constraints, wherein one query constraint of the plurality of query constraints specifies posts having privacy settings making the posts visible to all users of the online social network;
   identifying a plurality of posts matching the first trending topic and the query command, wherein each identified post has privacy settings making the post visible to all users of the online social network;
   calculating, for each of the identified posts, a score for the post based on one or more post-quality features, wherein the score is calculated using a machine-learning model that assigns a particular weight to each of the one or more post-quality features;
   generating a commentary module comprising at least a portion of each of one or more of the identified posts having scores higher than a threshold score; and
   sending, to the client system of the first user in response to receiving the query, instructions for presenting a user interface comprising the commentary module, the commentary module comprising an excerpt of at least one of the identified posts having a respective score higher than the threshold score.

2. The method of claim 1, further comprising:
   generating the plurality of trending topics based at least in part on online activities of a plurality of users of the online social network; and
   sending, to the client system of the first user, a user interface comprising the plurality of trending topics, wherein the query comprises a user selection of the first trending topic from among the presented plurality of trending topics.

3. The method of claim 1, further comprising sending, to the client system of the first user for display, a user interface comprising the plurality of trending topics.

4. The method of claim 1, wherein rewriting the query into the query command comprises replacing at least one n-gram of the query with an equivalent n-gram or an identifier corresponding to the n-gram.

5. The method of claim 1, wherein the plurality of query constraints further comprise one or more of:
   a query constraint specifying a timeframe for the creation of posts;
   a query constraint specifying a language of posts; or
   a query constraint specifying a type of entities as authors of posts.

6. The method of claim 1, wherein one or more of the post-quality features associated with each of the identified posts are extracted from one or more of:
   text of the post;
   metadata associated with the post;
   information associated with one or more other posts related to the post; or
   information associated with the first trending topic.

7. The method of claim 1, wherein one or more of the post-quality features associated with each of the identified posts are extracted using one or more deep-learning algorithms.

8. The method of claim 1, wherein the post-quality features associated with each of the identified posts comprise one or more of:
   a length of the post;
   an amount of text in the post determined to be unique;
   an amount of non-text content included in the post;
   a number of references to other posts included in the post; or
   a social signal associated with the post.

9. The method of claim 1, further comprising classifying the identified posts into one or more quality-based categories based on the post-quality features associated with the respective posts.

10. The method of claim 1, wherein the post-quality features associated with each of the identified posts comprise a characterization of a core sentiment associated with the post.

11. The method of claim 10, further comprising classifying the identified posts into one or more sentiment-based categories based on the core sentiments associated with the respective posts.

12. The method of claim 1, wherein each of one or more of the identified posts is associated with one or more tags each describing a sentiment expressed by the post.

13. The method of claim 1, wherein the post-quality features associated with each of the identified posts comprise one or more of:
   a degree of matching between the post and the first trending topic based on a probabilistic retrieval framework analysis of the post and the first trending topic;
   a degree of similarity between the post and the first trending topic based on a comparison of vector representations of the post and the first trending topic;
   a number of components of the post that match the first trending topic;
   matching of a content object referenced by the post with a headline stored in association with the first trending topic; or
   matching of a topic associated with the post with the first trending topic.

14. The method of claim 1, wherein the post-quality features associated with each of the identified posts comprise one or more of:
   an age of the post; or
   a duration of time between when the post was created and when the first trending topic was identified to be trending.

15. The method of claim 1, wherein the identified posts within the commentary module are presented in ranked order based on the score of each of the posts.

16. The method of claim 1, wherein the commentary module is operable to retrieve one or more additional posts for display responsive to the first user requesting to view additional posts.

17. The method of claim 1, wherein the commentary module comprises an entirety of at least one of the identified posts having a score higher than the threshold score.

18. One or more computer-readable non-transitory storage media embodying software that is operable when executed to:
   receive, from a client system of a first user of an online social network, a query comprising one or more terms;
   determine a first trending topic of a plurality of trending topics associated with one or more of the terms of the query;
   rewrite the query into a query command comprising a plurality of query constraints, wherein one query constraint of the plurality of query constraints specifies posts having privacy settings making the posts visible to all users of the online social network;
   identify a plurality of posts matching the first trending topic and the query command, wherein each identified post has privacy settings making the post visible to all users of the online social network;
   calculate, for each of the identified posts, a score for the post based on one or more post-quality features, wherein the score is calculated using a machine-learning model that assigns a particular weight to each of the one or more post-quality features;
   generate a commentary module comprising at least a portion of each of one or more of the identified posts having scores higher than a threshold score; and
   send, to the client system of the first user in response to receiving the query, instructions for presenting a user interface comprising the commentary module, the commentary module comprising an excerpt of at least one of the identified posts having a respective score higher than the threshold score.

19. A system comprising: one or more processors; and a non-transitory memory coupled to the processors comprising instructions executable by the processors, the processors operable when executing the instructions to:
   receive, from a client system of a first user of an online social network, a query comprising one or more terms;
   determine a first trending topic of a plurality of trending topics associated with one or more of the terms of the query;
   rewrite the query into a query command comprising a plurality of query constraints, wherein one query constraint of the plurality of query constraints specifies posts having privacy settings making the posts visible to all users of the online social network;
   identify a plurality of posts matching the first trending topic and the query command, wherein each identified post has privacy settings making the post visible to all users of the online social network;
   calculate, for each of the identified posts, a score for the post based on one or more post-quality features, wherein the score is calculated using a machine-learning model that assigns a particular weight to each of the one or more post-quality features;
   generate a commentary module comprising at least a portion of each of one or more of the identified posts having scores higher than a threshold score; and
   send, to the client system of the first user in response to receiving the query, instructions for presenting a user interface comprising the commentary module, the commentary module comprising an excerpt of at least one of the identified posts having a respective score higher than the threshold score.

* * * * *